United States Patent
Hölzl et al.

(10) Patent No.: US 11,961,012 B2
(45) Date of Patent: Apr. 16, 2024

(54) METHOD FOR COMPUTER-IMPLEMENTED DETERMINATION OF A DATA-DRIVEN PREDICTION MODEL

(71) Applicant: SIEMENS AKTIENGESELLSCHAFT, Munich (DE)

(72) Inventors: Andreas Hölzl, Munich (DE); Sonja Zillner, Munich (DE)

(73) Assignee: SIEMENS AKTIENGESELLSCHAFT (DE)

( * ) Notice: Subject to any disclaimer, the term of this patent is extended or adjusted under 35 U.S.C. 154(b) by 1201 days.

(21) Appl. No.: 16/156,059

(22) Filed: Oct. 10, 2018

(65) Prior Publication Data

US 2019/0114550 A1 Apr. 18, 2019
US 2023/0394331 A9 Dec. 7, 2023

(30) Foreign Application Priority Data

Oct. 13, 2017 (EP) .................................. 17196409

(51) Int. Cl.
*G06N 5/04* (2023.01)
*G06F 16/22* (2019.01)
(Continued)

(52) U.S. Cl.
CPC ........... *G06N 5/04* (2013.01); *G06F 16/2246* (2019.01); *G06F 16/2379* (2019.01); *G06N 5/022* (2013.01); *G06N 20/00* (2019.01)

(58) Field of Classification Search
CPC .... G06N 5/04; G06N 5/02–022; G06N 20/00; G06F 16/2246
(Continued)

(56) References Cited

U.S. PATENT DOCUMENTS

2010/0076799 A1* 3/2010 Magent ................. G16H 50/50
  705/7.31
2013/0096947 A1* 4/2013 Shah ...................... G16H 10/60
  705/3

(Continued)

OTHER PUBLICATIONS

Drazin, Sam, and Matt Montag. "Decision tree analysis using weka." Machine Learning-Project II, University of Miami (2012): 1-3. (Year: 2012).*

(Continued)

*Primary Examiner* — Jue Louie
(74) *Attorney, Agent, or Firm* — Schmeiser, Olsen & Watts LLP

(57) ABSTRACT

Provided is a method for computer-implemented determination of a data-driven prediction model. The method processes digital input data having input and output variables and being semantically annotated based on a digital semantic representation having a hierarchical tree structure where each tree in the structure represents an input variable of the data, the leaf nodes of the respective tree being the discrete values of the input variable. The method of the embodiment provides a recoding of those discrete values by cutting off hierarchical levels of the respective trees. Based on this recoding, a plurality of data modifications is determined for the input data. Those data modifications are trained by a machine learning method where the trained machine learning method with the highest prediction quality is derived from the trained machine learning methods.

10 Claims, 2 Drawing Sheets

Figure 1:
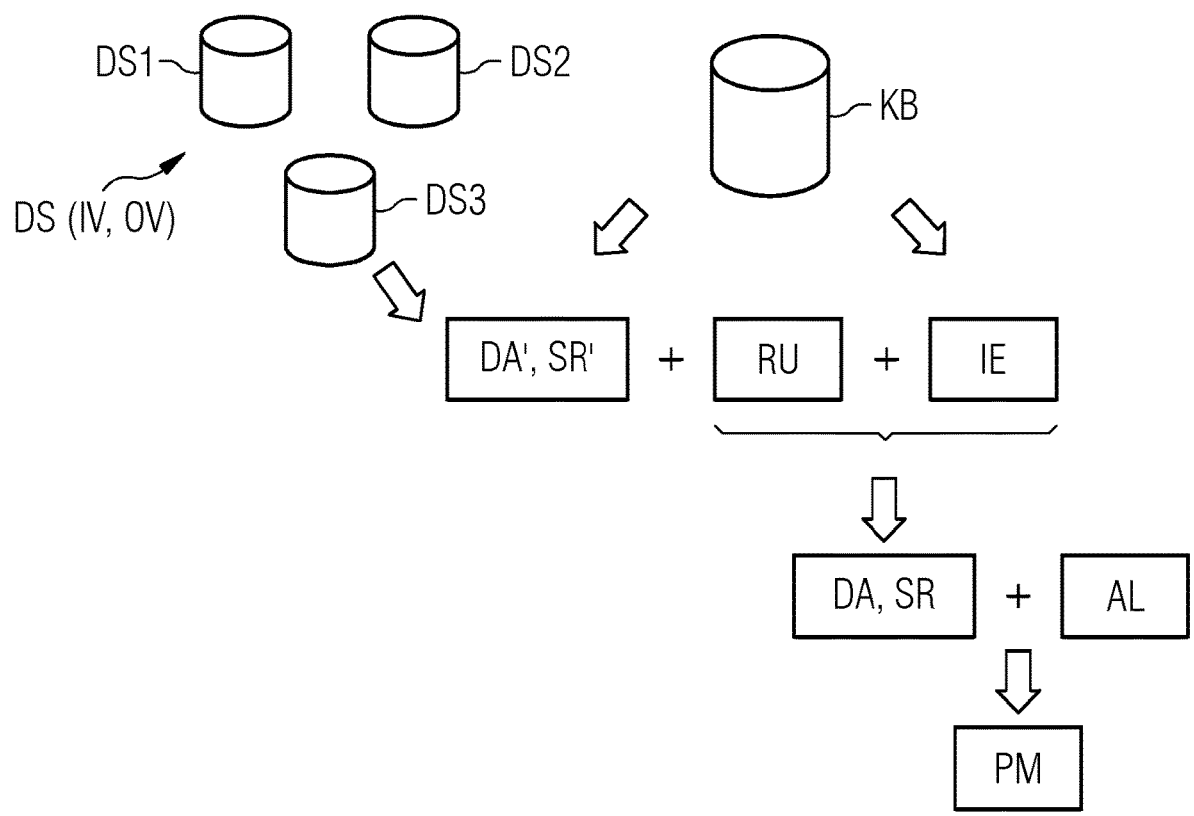

(51) Int. Cl.
   *G06F 16/23* (2019.01)
   *G06N 5/022* (2023.01)
   *G06N 20/00* (2019.01)
(58) Field of Classification Search
   USPC .............................................. 706/12, 45–47
   See application file for complete search history.

(56) References Cited

U.S. PATENT DOCUMENTS

| | | | | |
|---|---|---|---|---|
| 2015/0073306 | A1* | 3/2015 | Abeyratne | A61B 5/742 600/586 |
| 2016/0170996 | A1* | 6/2016 | Frank | G06F 16/24578 707/748 |
| 2019/0102802 | A1* | 4/2019 | Tuschman | G06Q 30/0204 |

OTHER PUBLICATIONS

Fung et al. "Anonymizing Classification Data for Privacy Preservation", May 2007, IEEE Transactions of Knowledge and Data Engineering, vol. 19, No. 5.*

Emam et al. "A Globally Optimal k-Anonymity Method for the De-Identification of Health Data", 2009, J Am Med Inform Assoc.*

Prasser et al. "A Tool for Optimizing De-Identified Health Data for Use in Statistical Classification" Jun. 2017, 2017 IEEE 30th International Symposium on Computer-Based Medical Systems.*

Dou Dejing et al.: "Semantic data mining: A survey of ontology-based approaches", Proceedings of the 2015 IEEE 9th International Conference On Semantic Computing (IEEE ICSC 2015), IEEE, Feb. 7, 2015 (Feb. 7, 2015), pp. 244-251, XP032741519, DOI: 10.1109/ICOSC.2015.7050814 [retrieved on Feb. 26, 2015], the whole document; 2015.

Sunil Ray: "Simple Methods to deal with Categorical Variables in Predictive Modeling", Analytics Vidhya, XP055466051, Retrieved from the Internet: URL:https://web.archive.org/web/20170306182835/https://www.analyticsvidhya.com/blog/2015/11/easy-methods-deal-categorical-variables-predictive-modeling/ [retrieved on Apr. 10, 2018], * pp. 1-6; 2015.

Halvorsen Kjetil B: "Preprocess categorical variables with many values", XP055466066, Retrieved from the Internet: URL:https://stats.stackexchange.com/questions/227125/preprocess-categorical-variables-with-many-values, [retrieved on Apr. 10, 2018], the whole document; 2017.

European Patent Office extended European search report for application No. 17196409.1; mailing date Apr. 20, 2018; 12 pages.

* cited by examiner

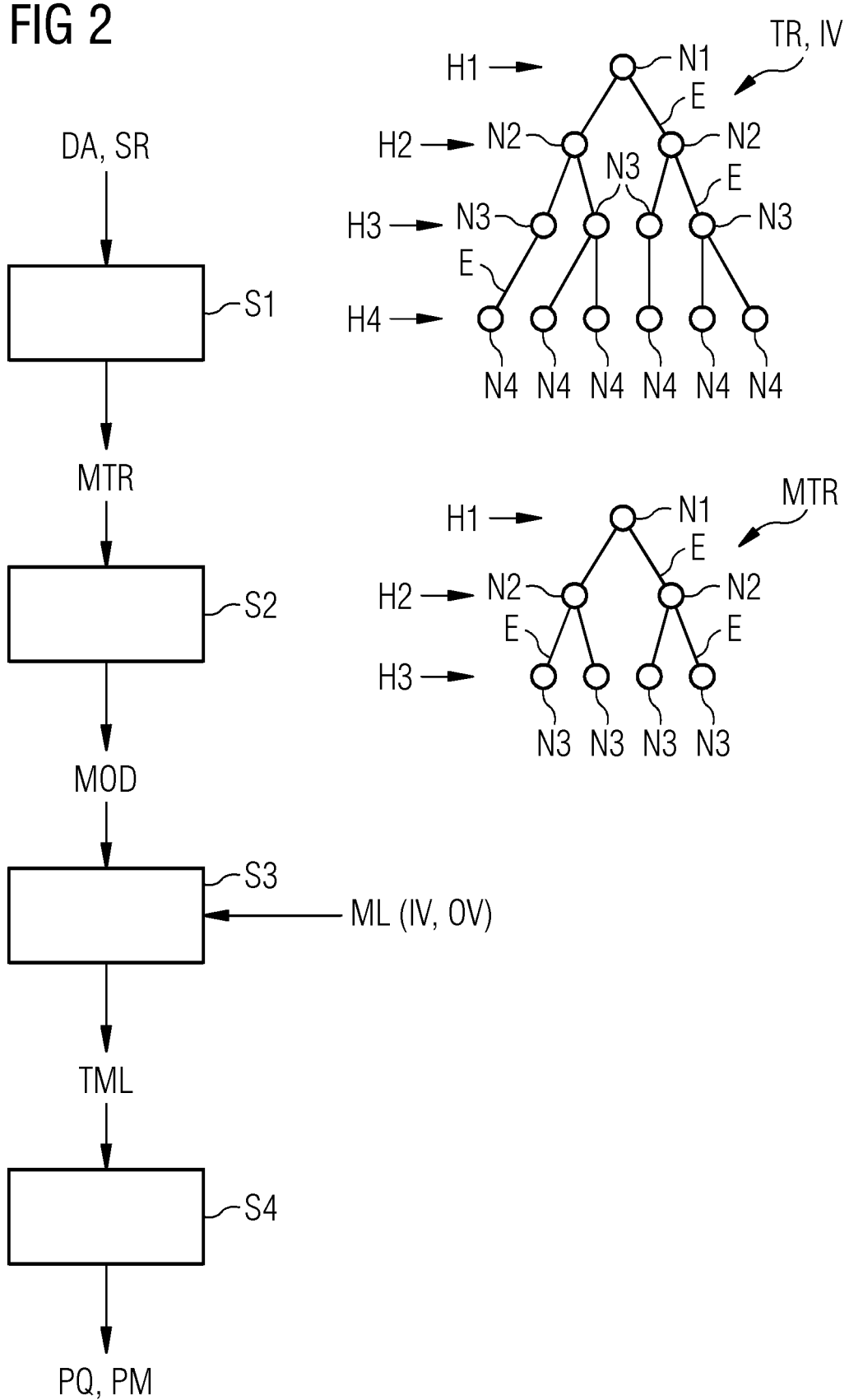

METHOD FOR COMPUTER-IMPLEMENTED DETERMINATION OF A DATA-DRIVEN PREDICTION MODEL

CROSS-REFERENCE TO RELATED APPLICATIONS

This application claims priority to European Application No. 17196409.1, having a filing date of Oct. 13, 2017, the entire contents of which are hereby incorporated by reference.

FIELD OF TECHNOLOGY

The following relates to a method and an apparatus for computer-implemented determination of a data-driven prediction model. Furthermore, the following refers to a corresponding computer program product (non-transitory computer readable storage medium having instructions, which when executed by a processor, perform actions) and a corresponding computer program.

BACKGROUND

Data analytics and the development of data-driven prediction models are an important technology being used in different areas of application.

For instance, in the public transportation domain, collecting, preprocessing and analyzing of sensor data and operational data from one or several transportation units may prevent failures of the whole transportation unit or a part of the transportation unit. Hence, downtimes of transportation units can be avoided and the maintenance costs can be optimized resulting in a better quality of service for customers.

Another application area of data analytics is the health care domain. By collecting data about diseases and treatments of patients as well as population related data, the effectiveness of treatments for individual persons can be inferred.

Data-driven prediction models enable to forecast output data based on a large amount of input data. To do so, machine learning methods are trained on the input data. For a high quality of prediction, data preprocessing is of high relevance and requires a high degree of domain expertise.

For digitally representing domain expertise, semantic models are well-known in the prior art. A semantic model describes semantic information based on one or more ontologies. The ontologies use a formalism to describe semantic knowledge, e.g. based on RDF (RDF=Resource Description Framework). The ontologies comprise a plurality of ontology elements, such as concepts, types, relations, axioms and so on.

In the field of data analytics, a situation may occur where there are too many category levels of an input variable or an output variable making it difficult to interpret the results of a machine learning method. By recoding the category levels, the number of levels can be reduced. This recoding is usually performed manually by a data scientist or data analyst.

There are some automated approaches to optimize the performance of prediction models by identifying an optimal combination of data cleaning steps and data analytics methods. However, those approaches do not address variable recoding and do not make use of semantic models.

SUMMARY

An aspect relates to providing a method for computer-implemented determination of a data-driven prediction model, the prediction model providing a high prediction quality.

In a step a) performed by the method of embodiments of the invention, digital input data are provided having data sets associated with a plurality of input variables and a number of output variables (i.e. one or more output variables). In other words, each data set includes values of input variables and corresponding value(s) of output variables associated with the input variables. The input data are semantically annotated based on a digital semantic representation. The semantic representation comprises a plurality of trees, where each tree is assigned to a respective input variable of at least some of the plurality of input variables and where each tree comprises a plurality of nodes representing ontology elements of a knowledge base. Any known ontology language, e.g. based on the RDF framework, may be used in order to describe the knowledge base. The ontology elements included in the trees refer to concepts and/or attributes which are well-known elements of ontologies.

The nodes of a respective tree comprise a root node in an uppermost hierarchical level and nodes in one or more hierarchical levels lower than the uppermost hierarchical level, where each ontology element of a respective node in a hierarchical level is a sub-category of the ontology element of the node in the adjacent higher hierarchical level connected by an edge to the respective node. The nodes in the lowest hierarchical level are leaf nodes associated with discrete values of the input variable to which the respective tree is assigned. Hence, a tree for each input variable is used for semantically describing the association of discrete values of an input variable to categories defined in a knowledge base.

In a step b) of the method according to embodiments of the invention, the discrete values of the input variable to which each tree is assigned are recoded by determining a number of modified trees for the respective tree, a modified tree being derived by cutting off one or more hierarchical levels from the respective tree, thus substituting the leaf nodes of the respective tree by nodes in a higher hierarchical level. I.e., an automatic recoding is done by representing the discrete values of an input variable with less granularity based on a modified tree. Each modified tree corresponds to a different recoding of the discrete values of the respective input variable.

In a step c), a plurality of different data modifications of the input data is determined, each data modification comprising one or more recoded discrete values of one or more input variables. I.e., each data modification includes all input variables, where at least a part of the input variables and all input variables are represented by recoded values.

In a step d), a machine learning method for predicting the number of output variables based on the plurality of input variables is trained, the training being performed based on the data modifications and also on the input data, resulting in several trained machine learning methods. I.e., for each data modification and also for the input data, a respective training of the machine learning method is performed so that there is a trained machine learning method for each data modification and also for the input data.

Thereafter, in a step e), the prediction quality of the trained machine learning methods is determined, where the trained machine learning method having the highest prediction quality forms the data-driven prediction model being determined by the method of embodiments of the invention.

The method of embodiments of the invention provides an optimal bundling of categorical discrete values of input variables in order to derive an optimal prediction model. To do so, an automatic recoding of input variables is combined with a semantic model and a machine learning method.

In an exemplary embodiment of the method according to the invention, the number of modified trees determined in step b) comprises for each tree all modified trees derivable therefrom by cutting off one or more hierarchical levels. Alternatively or additionally, the plurality of data modifications comprises all possible combinations of recoded discrete values. Hence, all possible modifications are analyzed in order to find the prediction model with the highest prediction quality.

According to the above step a), digital input data are provided. This can be accomplished by reading in already existing digital input data. However, step a) may also include a step of generating those input data. Step a) includes a step of an automatic semantic annotation. This annotation may be performed directly on the input data. However, the annotation may also be performed on other data than the input data where the input data result from the semantically annotated other data by one or more additional processing steps.

In another variant of embodiments of the invention, step a) includes an inferring step performed by an inference engine in order to derive additional knowledge from the knowledge base, the additional knowledge being included in the semantic representation. The inferring step processes a set of rules and/or additional information from one or more data sources.

As a machine learning method being trained in the method of embodiments of the invention, any known method may be used. The machine learning method is based on a Support Vector Machine and/or a neural network and/or decision trees, e.g. random forest, and/or a regression.

For describing the prediction quality, any measure known from the known art may be used. In an exemplary variant, the prediction quality is based on a cross-validated mean square error where some of the input data are regarded as training data and the other input data are used in order to evaluate the accuracy of the prediction based on the trained machine learning method.

The method of embodiments of the invention can be used for any kind of input data. In an exemplary variant, the input data refer to medical data of a plurality of (human or animal) patients, e.g. information about diseases and corresponding treatments. However, the input data may also refer to a technical system and may be data with respect to the operation and/or configuration of the technical system. E.g., the technical system may be a transport system, such as a public transport system, or a part therefrom or an electric power grid or a part therefrom, e.g. a unit for generating and/or distributing power, such as a gas turbine.

Besides the above method, embodiments of the invention refers to an apparatus for computer-implemented determination of a data-driven prediction model, the apparatus being configured to perform the method according to embodiments of the invention or one or more exemplary embodiments thereof. In other words, the apparatus comprises means for performing the method of embodiments of the invention or exemplary embodiments thereof.

Furthermore, embodiments of the invention refers to a computer program product with program code, which is stored on a machine readable carrier, for carrying out the method of embodiments of the invention or one or more exemplary embodiments thereof.

Furthermore, embodiments of the invention refers to a computer program with program code for carrying out the method according to embodiments of the invention or one or more exemplary embodiments thereof.

BRIEF DESCRIPTION

Some of the embodiments will be described in detail, with reference to the following figures, wherein like designations denote like members, wherein:

FIG. 1 is a diagram illustrating the steps performed in an embodiment of the invention; and FIG. 2 is a flowchart describing the steps performed by the recoding algorithm being part of the embodiment of FIG. 1.

DETAILED DESCRIPTION

The embodiment of the invention as shown in FIG. 1 processes data sets DS stemming from several data sources DS1, DS2 and DS3. E.g., the data sources may be respective databases. The data sets are associated with a plurality of input variables IV and a number of output variables OV. I.e., each data set comprises values of input and output variables. The input variables are independent variables and the output variables are de-pendent variables depending on the input variables. It is an aspect of embodiments of the invention to provide a prediction model which predicts output variables OV based on input variables IV by using the data sets DS as training data.

The data sets DS are semantically annotated based on a semantic representation SR which is derived from a knowledge base KB defining elements of an ontology. Those elements comprise concepts, types, attributes, relations and so on. The semantically annotated data sets are designated as data DA'. Based on the semantic annotation of the data DA', at least a subset of the input variables is associated with respective elements of the ontology. In the embodiment described herein, those elements refer to concepts and attributes defined in the knowledge base. The semantic annotation is performed by an automatic method. Such automatic methods are well-known for a skilled person. However, the semantic annotation may also be performed manually by an expert.

According to FIG. 1, a set of rules RU is analyzed by an inference engine IE which is implemented as a conventional reasoner. The inference engine has access to the knowledge base KB to derive additional knowledge from the knowledge base KB by using the rules RU. This additional knowledge is added to the semantic representation SR', resulting in an enhanced semantic representation SR as well as data DA derived from data DA' and semantically annotated by the enhanced semantic representation SR. The enhanced semantic representation SR is a semantic representation in the sense of the patent claims. Furthermore, the data DA are digital input data in the sense of the patent claims.

The representation SR includes a plurality of hierarchical trees, each tree being assigned to an input variable IV. This tree structure will be explained in more detail with respect to FIG. 2. An algorithm AL including an automatic recoding of the input variables is applied to the data DA. This algorithm comprises the training of a machine learning method based on recoded input variables and results in an optimal prediction model PM in terms of a high prediction quality.

The data DA processed in the embodiment of FIG. 1 can refer to arbitrary data. In an exemplary embodiment, those data refer to medical data describing medical information about a plurality of human patients. However, the data may also refer to information about a public transport system or any other kind of data.

FIG. 2 shows the steps performed by the algorithm AL of FIG. 1. As mentioned before, the semantic representation SR comprises a plurality of hierarchical trees. An example of such a tree TR is shown at the top of FIG. 2. Each tree is assigned to an input variable IV. I.e., there is a tree for each input variable described by the semantic representation SR. As shown in FIG. 2, a tree TR comprises several nodes N1, N2, N3 and N4 which are arranged in corresponding hierarchical levels H1, H2, H3 and H4. The higher the number of the hierarchical level, the lower in hierarchy is the hierarchical level. The nodes in adjacent hierarchical levels are connected by edges E. Only some of those edges are designated by this reference numeral. The nodes refer to ontology elements from the knowledge base KB. A node in a hierarchical level (except of level H1) forms a sub-category of the ontology element represented by the node in the adjacent higher hierarchical level being connected to the node in the lower hierarchical level. In other words, the hierarchical levels H1 to H4 form categorical levels where a lower hierarchical level defines sub-categories of the categories in the adjacent higher hierarchical level.

The node N1 in the uppermost hierarchical level H1 refers to the highest category. This node is designated as root node. Contrary to that, the nodes N4 in the hierarchical level H4 refer to the lowermost categories and are designated as leaf nodes. The ontology elements of those leaf nodes are associated with corresponding discrete values of the input variable IV represented by the tree TR. In other words, the hierarchical level H4 may be regarded as the input variable, where the nodes of the hierarchical level H4 form the discrete values which the corresponding input variable IV may have.

In case that the data DA describe medical data, the root node N1 of the tree TR may form the concept "treatment", whereas nodes N2 may refer to the concepts "surgery", "chemotherapy" and "medication". The concept "surgery" may be connected to nodes N3 referring to the concepts "palliative surgery" and "curative surgery". Furthermore, the concept "chemotherapy" may be connected to nodes N3 referring to the concepts "radiation", "external radiation beam" and "chemotherapy". Moreover, the concept "medication" may be connected to nodes N3 referring to the concepts "pain medication", "anti-depressiva" and "blood pressure medication". Furthermore, the node N3 referring to "curative surgery" may be connected to nodes N4 referring to the concepts "removal", "limb salvage" and "amputation".

According to FIG. 2, the data DA semantically annotated by the semantic representation SR are subjected to a step S1 which is a recoding step of the input variables IV associated with corresponding trees TR. The recording step results in a plurality of modified trees MTR. To do so, hierarchical levels are successively cut off from the corresponding tree. For the tree TR in FIG. 1, this will result in three modified trees, namely a tree only having the hierarchical levels H1 to H3, a tree only having the hierarchical levels H1 and H2 and a tree only being formed by the root node N1. This procedure provides a recording of the corresponding variable IV in the sense that the variable has less discrete values.

FIG. 2 shows an example of a modified tree MTR derived from the tree TR by cutting off the lowest hierarchical level. As a consequence, the tree MTR has the leaf nodes N3 which refer to more generic categories than the categories in hierarchical level H4. Therefore, some values of input variable which are associated to different ontology elements in the hierarchical level H4 of tree TR will be assigned to the same ontology element in the hierarchical level H3 in the modified tree MTR. Based on the above example referring to medical data, the ontology elements "removal", "limb salvage" and "amputation" may be mapped in a modified tree to the same ontology element "curative surgery".

The above described generation of modified trees may be expressed by the following rules:

Each ontology element in a hierarchical level of a tree can be recoded to an ontology element that is the ancestor in the tree, i.e. a more abstract node connected to the node of the ontology element to be recoded.

If an ontology element is recoded to another node, then all descendents of the other node in the tree are recoded to the other node.

Step S1 results in a plurality of modified trees MTR where all modified trees which can be derived from each tree TR are generated by step S1. Those modified trees are associated with recoded discrete values of the respective input variable IV represented by the corresponding tree.

In a next step S2, data modifications MOD are determined based on all possible combinations of modified trees for the input variables. In other words, each data modification determined by step S2 refers to a different combination of recoded values of the input variables IV associated with corresponding trees.

In a next step S3, the data modifications MOD as well as the original data DA are used for training a machine learning method ML. The machine learning method is configured to predict unknown output variables OV based on known input variables IV. Any common machine learning method may be used in step S3, e.g. a Support Vector Machine, an artificial neural network, decision trees, a regression and the like. As a result of step S3, a plurality of trained machine learning methods TML is provided, each trained machine learning method referring to one of the input data and data modifications.

In a step S4, each trained machine learning method TML is evaluated by determining a prediction quality PQ which is a parameter describing the deviation between the values of the output variables determined by the trained machine learning method and the corresponding values included in the data DA or data modifications MOD. In an exemplary embodiment, the prediction quality is the cross-validated mean square error between the predicted values of the output variables and the actual values of the output variables. As part of step S4, the trained machine learning method with the highest prediction quality is determined as the optimal prediction model PM which corresponds to the determined prediction model in the sense of claim 1.

When applying the optimal prediction model PM to new data, the data are converted (if necessary) to comply with the trained machine learning method having the highest prediction quality. I.e., the recoding of input variables applicable for the machine learning method is performed. If the best machine learning method is based on the original data DA, the trained machine learning method can be directly applied to the new data without recoding.

The embodiment as described in the foregoing has several advantages. Particularly, a machine learning method is combined with variable recoding which is achieved by modifying trees of a semantic representation. As a consequence, the training of the machine learning method can be performed with different variable recordings in order to determine which variable recoding leads to the best prediction result of the machine learning method.

The invention claimed is:

1. A method for computer-implemented determination of a data-driven prediction model, comprising the steps of:
   a) providing digital input data having data sets associated with a plurality of input variables and a number of output variables, the input data being semantically annotated based on a digital semantic representation, the semantic representation comprising a plurality of trees, where each tree is assigned to a respective input variable of at least some of the plurality of input variables and where each tree comprises a plurality of nodes representing ontology elements of a knowledge base, the nodes comprising a root node in an uppermost hierarchical level and nodes in one or more hierarchical levels lower than the uppermost hierarchical level, where each ontology element of a respective node in a hierarchical level is a sub-category of the ontology element of the node in the adjacent higher hierarchical level connected by an edge to the respective node, the nodes in the lowest hierarchical level being leaf nodes associated with discrete values of the input variable to which the respective tree is assigned;
   b) automatically recoding the discrete values of the input variable to which each tree is assigned by determining a plurality of modified trees for the respective tree, a modified tree being derived by cutting off one or more hierarchical levels from the respective tree, thus substituting the leaf nodes of the respective tree by nodes in a higher hierarchical level, wherein each modified tree of the plurality of modified trees corresponds to a different recoding of the discrete values of the respective input variable to which the respective tree is assigned, wherein the plurality of modified trees comprises for each tree all modified trees derivable therefrom by cutting off one or more hierarchical levels;
   c) determining a plurality of different data modifications of the input data, each data modification comprising one or more recoded discrete values of one or more input variables, wherein the plurality of data modifications comprises all possible combinations of recoded discrete values based on the plurality of modified trees;
   d) training a machine learning method for predicting the number of output variables based on the plurality of input variables, the training being performed based on the data modifications, resulting in several trained machine learning methods; and
   e) determining the prediction quality of the trained machine learning methods, where the trained machine learning method having the highest prediction quality forms the determined data-driven prediction model.

2. The method according to claim 1, wherein the ontology elements comprise one or more concepts and/or one or more attributes.

3. The method according to claim 1, wherein step a) includes a step of an automatic semantic annotation.

4. The method according to claim 1, wherein step a) includes an inferring step performed by an inference engine in order to derive additional knowledge from the knowledge base, the additional knowledge being included in the semantic representation.

5. The method according to claim 4, wherein the inferring step processes a set of rules and/or additional information from one or more data sources.

6. The method according to claim 1, wherein the machine learning method is based on a Support Vector Machine and/or a neural network and/or decision trees and/or a regression.

7. The method according to claim 1, wherein the prediction quality is determined based on a cross-validated mean square error.

8. The method according to claim 1, wherein the input data provided in step a) refer to medical data of a plurality of patients or data of a technical system, where the technical system is a transport system or a part therefrom or an electric power grid or a part therefrom.

9. An apparatus for computer-implemented determination of a data-driven prediction model, comprising:
   a processor comprising hardware, the processor configured to:
   a) provide digital input data having data sets associated with a plurality of input variables and a number of output variables, the input data being semantically annotated based on a digital semantic representation, the semantic representation comprising a plurality of trees, where each tree is assigned to a respective input variable of at least some of the plurality of input variables and where each tree comprises a plurality of nodes representing ontology elements of a knowledge base, the nodes comprising a root node in an uppermost hierarchical level and nodes in one or more hierarchical levels lower than the uppermost hierarchical level, where each ontology element of a respective node in a hierarchical level is a sub-category of the ontology element of the node in the adjacent higher hierarchical level connected by an edge to the respective node, the nodes in the lowest hierarchical level being leaf nodes associated with discrete values of the input variable to which the respective tree is assigned;
   b) automatically recode the discrete values of the input variable to which each tree is assigned by determining a plurality of modified trees for the respective tree, a modified tree being derived by cutting off one or more hierarchical levels from the respective tree, thus substituting the leaf nodes of the respective tree by nodes in a higher hierarchical level, wherein each modified tree of the plurality of modified trees corresponds to a different recoding of the discrete values of the respective input variable to which the respective tree is assigned, wherein the plurality of modified trees comprises for each tree all modified trees derivable therefrom by cutting off one or more hierarchical levels;
   c) determine a plurality of different data modifications of the input data, each data modification comprising one or more recoded discrete values of one or more input variables, wherein the plurality of data modifications comprises all possible combinations of recoded discrete values based on the plurality of modified trees;
   d) train a machine learning method for predicting the number of output variables based on the plurality of input variables, the training being performed based on the data modifications, resulting in several trained machine learning methods; and
   e) determine the prediction quality of the trained machine learning methods, where the trained machine learning method having the highest prediction quality forms the determined data-driven prediction mode.

10. A computer program product, comprising a computer readable hardware storage device having computer readable program code stored therein, said program code executable by a processor of a computer system to implement a method when the program code is executed on a computer, the method including a) providing digital input data having data sets associated with a plurality of input variables and a number of output variables, the input data being semantically annotated based on a digital semantic representation, the semantic representation comprising a plurality of trees, where each tree is assigned to a respective input variable of at least some of the plurality of input variables and where each tree comprises a plurality of nodes representing ontology elements of a knowledge base, the nodes comprising a root node in an uppermost hierarchical level and nodes in one or more hierarchical levels lower than the uppermost hierarchical level, where each ontology element of a respective node in a hierarchical level is a sub-category of the ontology element of the node in the adjacent higher hierarchical level connected by an edge to the respective node, the nodes in the lowest hierarchical level being leaf nodes associated with discrete values of the input variable to which the respective tree is assigned;

b) automatically recoding the discrete values of the input variable to which each tree is assigned by determining a plurality of modified trees for the respective tree, a modified tree being derived by cutting off one or more hierarchical levels from the respective tree, thus substituting the leaf nodes of the respective tree by nodes in a higher hierarchical level, wherein each modified tree of the plurality of modified trees corresponds to a different recoding of the discrete values of the respective input variable to which the respective tree is assigned, wherein the plurality of modified trees comprises for each tree all modified trees derivable therefrom by cutting off one or more hierarchical levels;

c) determining a plurality of different data modifications of the input data, each data modification comprising one or more recoded discrete values of one or more input variables, wherein the plurality of data modifications comprises all possible combinations of recoded discrete values based on the plurality of modified trees;

d) training a machine learning method for predicting the number of output variables based on the plurality of input variables, the training being performed based on the data modifications, resulting in several trained machine learning methods;

e) determining the prediction quality of the trained machine learning methods, where the trained machine learning method having the highest prediction quality forms the determined data-driven prediction model.

* * * * *